United States Patent [19]

Iwaki

[11] Patent Number: 4,584,516
[45] Date of Patent: Apr. 22, 1986

[54] CHARGE DISPLAY CIRCUIT

[75] Inventor: Yoshiyuki Iwaki, Hyogo, Japan

[73] Assignee: Mitsubishi Denki Kabushiki Kaisha, Tokyo, Japan

[21] Appl. No.: 621,751

[22] Filed: Jun. 18, 1984

[30] Foreign Application Priority Data

Jun. 28, 1983 [JP] Japan ............................ 58-101878[U]

[51] Int. Cl.$^4$ ................................................ H02J 7/14
[52] U.S. Cl. ........................................ 322/99; 320/64; 322/33
[58] Field of Search ......................... 320/35, 36, 64, 48; 322/28, 33, 81, 60, 73, 99

[56] References Cited

U.S. PATENT DOCUMENTS

| | | | |
|---|---|---|---|
| 3,217,311 | 11/1965 | Custer et al. | 320/48 |
| 3,534,241 | 10/1970 | Wilson et al. | 320/35 X |
| 4,295,087 | 10/1981 | Morishita et al. | 322/99 |
| 4,415,849 | 11/1983 | Sievers et al. | 322/33 X |
| 4,435,676 | 3/1984 | Morishita | 322/33 |

*Primary Examiner*—R. J. Hickey
*Attorney, Agent, or Firm*—Sughrue, Mion, Zinn, Macpeak & Seas

[57] ABSTRACT

A charge display circuit for indicating the charging state of an automotive electrical system in which the brightness of the charge display lamp is increased while reducing the average power consumption of the circuit. A rectifier circuit having first and second DC output terminals and an AC input terminal is connected to the output winding assembly of an AC generator with the first DC output terminal connected to one terminal of the battery to charge the battery. A charge display lamp is connected through a key switch between the second DC output terminal and the charging terminal of the battery. A resistor having a positive temperature coefficient is connected between the connecting point of the charge display lamp and second DC output terminal and a ground terminal. The resistor may be implemented as a plurality of resistors having positive temperature coefficients connected in parallel with one another, or as a fixed resistor connected in parallel with a resistor having a positive temperature coefficient.

3 Claims, 4 Drawing Figures

CHARGE DISPLAY CIRCUIT

BACKGROUND OF THE INVENTION

The present invention relates to charge display circuits for motor vehicles, and more particularly, to a charge display circuit of which the power consumption is reduced.

A conventional charge display circuit is shown in FIG. 1. In the circuit of FIG. 1, a charging generator 1 includes an AC generator having three-phase output windings 2 and a field winding 3, and a full-wave rectifier circuit including a rectifier 4, a first rectifier output terminal 5, a second rectifier output terminal and an AC input terminal 7. In FIG. 1, reference numeral 8 designates a charge display lamp; 9, a key switch; 10, a resistor through which current flows for turning on the charge display lamp; 11, a regulator; and E, a battery.

When the key switch 9 is closed, current flows from the battery E through the charge display lamp 8 and the resistor 10 so that the charge display lamp 8 is turned on. When the engine (not shown) starts to drive the charging generator 1, a voltage is developed at the second rectifier output terminal 6 so that the voltages at the two terminals of the charge display lamp 8 become equal. As a result, the charge display lamp 8 is turned off, and a larger current flows in the resistor 10.

When the generation of electricity is suspended, for instance, because the field winding is broken during the operation of the engine, no voltage is provided at the second rectifier output terminal 6. Accordingly, current again flows from the battery E through the charge display lamp 8 to the resistor 10 so that the charge display lamp 8 is turned on, thus indicating the fault in the field winding 3. That is, the resistor 10 serves as a resistor for detecting faults in the field circuit.

However, the above-described conventional circuit is disadvantageous in that, if the resistance of the resistor 10 is decreased, the brightness of the charge display lamp 8 is increased, but the amount of current flowing in the resistor 10 is increased, thus increasing the loss of electric power. If, on the other hand, the resistance of the resistor 10 is increased, the loss of electric power is decreased, but the brightness of the charge display lamp 8 is decreased.

SUMMARY OF THE INVENTION

Accordingly, an object of the invention is to provide a charge display circuit in which the loss of power in the resistor is reduced and the charge display lamp is more brightly lit.

The foregoing object and other objects of the invention have been achieved by the provision of a charge display circuit which, according to the invention, includes an AC generator, a rectifier circuit coupled to the AC generator, the rectifier circuit having a firct DC terminal connected to one terminal of a battery to charge the latter and a second DC terminal which is connected through a charge display lamp and a key switch to the one terminal of the battery, and a resistor having a positive temperature coefficient connected between the second DC output terminal and ground.

The nature, principle and utility of the invention will become more apparent from the following detailed description when read in conjunction with the accompanying drawings.

DESCRIPTION OF THE PREFERRED EMBODIMENTS

Figure 1:
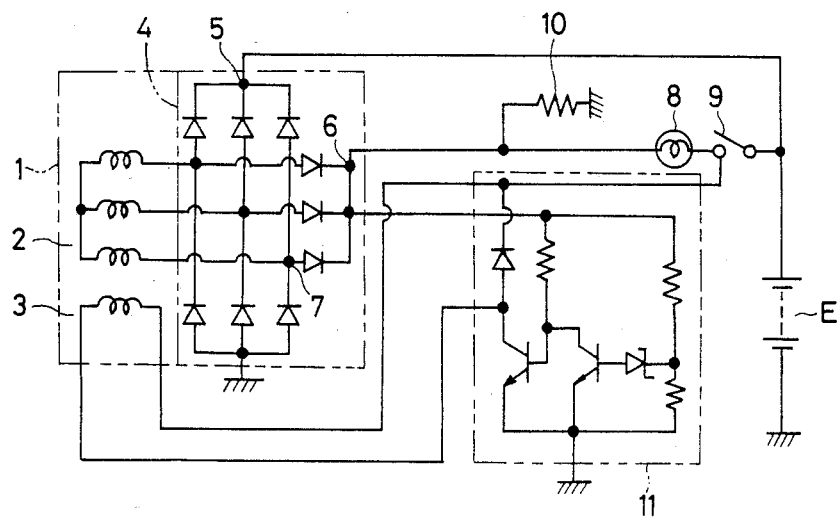
FIG. 1 is a circuit diagram showing an example of a conventional charge display circuit.
Figure 2:
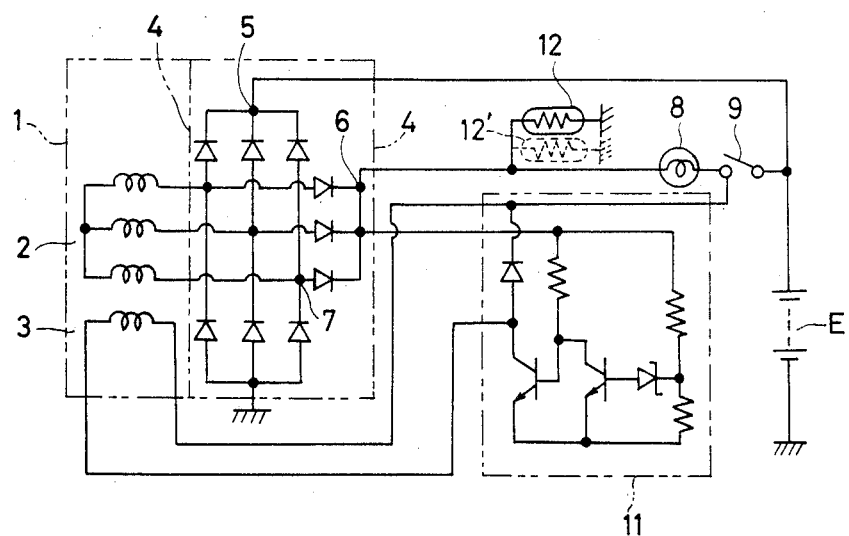
FIG. 2 is a circuit diagram showing an example of a charge display circuit according to the invention.
Figure 3:
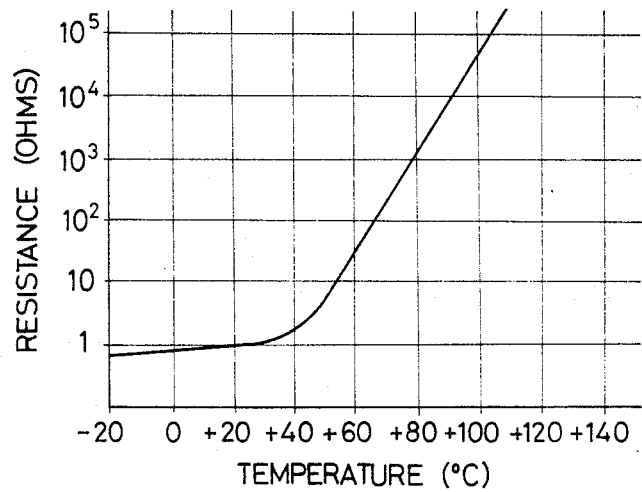
FIG. 3 is a graphical representation indicating the positive temperature characteristic of a resistor in the circuit of the invention.

A first example of a charge display circuit according to the invention is shown in FIG. 2. In FIG. 2, those components which have been already described with reference to FIG. 1 are therefore designated by the same reference numerals. In the charge display circuit, a resistor 12 having a positive temperature characteristic (hereinafter referred to as "a PTC 12", when applicable) is connected between the second DC output terminal 6 and the ground. The PTC is, for instance, a "Posistar" (trademark) device manufactured by Murata Seisakusho of Japan, having a temperature characteristic as shown in FIG. 3.

When, in the circuit of FIG. 2, the key switch 9 is closed, a current flows from the battery E through the charge display lamp 8 and the PTC 12, turning on the charge display lamp 8. Since the PTC 12 has a low resistance at room temperature, the charge display lamp 8 is brightly lit.

For instance, a 12 V, 3.4 W charge display lamp has a resistance of 40 ohms. If the PTC 12 has a resistance of 2 ohms, then the voltage applied to the charge display lamp is 40/42 times the supply voltage, and hence the charge display lamp is brightly lit. If, in this case, the voltage of the battery E is 12 V, then the power consumption of the PTC 12 is:

$$(12/42)^2 \times 2 = 0.16 \text{ W}.$$

This value is not so high that the temperature of the PTC 12 is significantly increased. Therefore, the resistance is not charged substantially, and the charge display lamp 12 remains bright.

When the engine starts to drive the charging generator 1 and the latter produces, for instance, a voltage of 14 V at the second rectifier output terminal 6, then the voltage of 14 V is applied to the PTC 12, in which case the power consumption is:

$$14^2/2 \approx 100 \text{ W}.$$

In this case, the PTC 12 is quickly heated and its resistance accordingly increases. When the resistance is stabilized, for instance, at 100 ohms, the power consumption decreases, in this case, to:

$$14^2/100 \approx 2 \text{ W}.$$

In the conventional circuit, the resistor 10 has a resistance of about 20 ohms, and therefore the power consumption is:

$$14^2/20 \approx 10 \text{ W}.$$

Thus, the effect of the use of the PTC 12 is apparent from the face that the power consumption is reduced from 10 W to 2 W.

Figure 4:
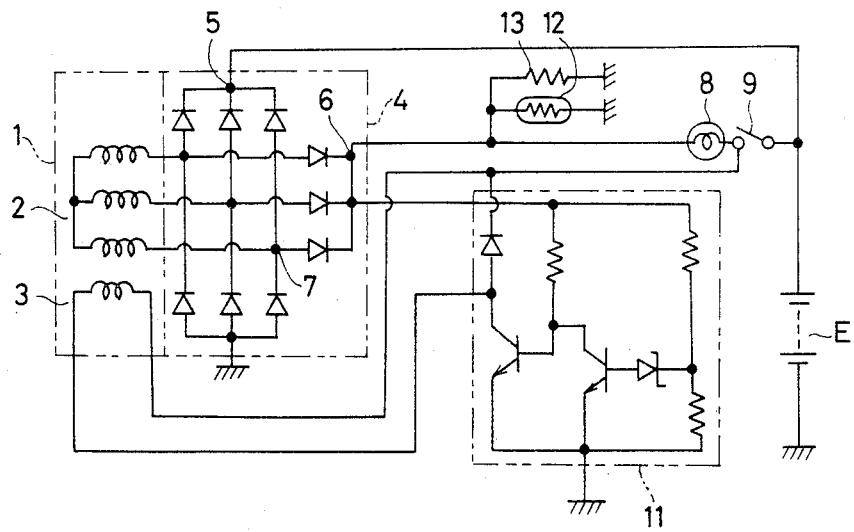
FIG. 4 is a circuit diagram showing another example of a charge display circuit according to the invention.

FIG. 4 shows a second example of a charge display circuit according to the invention. The circuit of the second example is formed by connecting a fixed resistor 13 in parallel with the PTC 12 in the circuit of FIG. 3.

If the resistor 13 has a resistance of about 100 ohms, the charge display lamp 8 will light when the PTC 12 is broken. When the resistance of the PTC 12 is high because the temperature of the PTC 12 is high immediately after the engine stops, suspending the power generation of the charging generator 1, the resistor 13 serves to turn on the charge display lamp. Instead of the resistor 13, another PTC 12′ may be connected as indicated by dotted lines in FIG. 2, that is, two PTC's may be employed.

As is apparent from the above description, according to the invention, a PTC is connected between the connecting point of the second rectifier output terminal of the charging generator and the charge display lamp and ground so that the charge display lamp is turned on. Accordingly, the charge display lamp is brightly lit when needed, and when it is not lit, the loss of power is reduced.

I claim:

1. A charge display circuit comprising:
   an AC generator having an output winding assembly;
   a rectifier circuit having first and second DC output terminals and an AC input terminal connected to said output winding assembly;
   means for connecting said first DC output terminal to one terminal of a battery to charge said battery;
   a key switch;
   a charge display lamp connected through said key switch between said second DC output terminal of said rectifier circuit and said one terminal of said battery; and
   a resistor having a positive temperature coefficient connected between a connecting point of said charge display lamp and said second DC output terminal and a ground terminal.

2. The charge display circuit as claimed in claim 1, wherein said resistor comprises a plurality of resistors having positive temperature coefficients connected in parallel between said connecting point of said charge display lamp and second DC output terminal and said ground terminal.

3. The charge display circuit as claimed in claim 1, further comprising a fixed resistor connected in parallel with said resistor.

* * * * *